Patented May 11, 1937

2,079,940

UNITED STATES PATENT OFFICE 2,079,940

PYRIDINO ACYLAMINO ANTHRAQUINONES

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application December 27, 1934, Serial No. 759,428. In Germany September 10, 1931

17 Claims. (Cl. 260—39)

The present invention relates to new vattable acylamino compounds and a process of producing same.

We have found that valuable vat dyestuffs are obtained by condensing vattable amino compounds with carboxylic acids which contain up to three condensed isocyclic rings condensed with at least one nitrogen-containing six-membered ring free from keto groups or by causing halogen derivatives of vattable compounds to react with the amides of the said carboxylic acids. As carboxylic acids of the said kind may be mentioned, for example, quinoline carboxylic acids or quinoline dicarboxylic acids and the substitution products of the aforementioned quinoline carboxylic acids, as for example their halogen, alkyl or alkoxy derivatives, such as quinaldine carboxylic acids, halogenquinoline carboxylic acids, alkoxy quinoline carboxylic acids, mono- and di-pyridinoanthraquinone carboxylic acids, pyridino-diphenyl carboxylic acids, alpha- and beta-azanthraquinone carboxylic acids, azabenzanthrone carboxylic acids, azaphenanthrene and di-azaphenanthrene carboxylic acids, azafluorene carboxylic acids, azachrysene carboxylic acids, aza- and diazapyrene carboxylic acids and diazaperylene carboxylic acids. The carboxylic acid groups may stand in an isocyclic ring as well as in a nitrogen-containing six-membered ring of the said carboxylic acids. Amino or halogen compounds capable of being vatted which are suitable for the said reactions are, for example, mono- or polyamino or halogen derivatives of anthraquinone, azanthraquinone, benzanthraquinones, 5-, 8- or Bz3-azabenzanthrones, anthraquinoneacridones, pyranthrones, anthanthrones, dibenzpyrenequinones, azadibenzpyrenequinones, dibenzanthrones and diazadibenzanthrones.

For the conversion of the amino compounds of vattable polynuclear compounds derivatives of the said carboxylic acids which are substituted in the carboxyl groups, as for example acid halides, may also be employed.

The reaction is preferably carried out in the presence of diluents, as for example nitrobenzene, dichlor- or trichlor-benzene or naphthalene. Agents combining with acids may also be added. In the conversion of the said halogen compounds with the said acid amides, an addition of copper or its compounds is often advantageous.

The reaction products are usually obtained in almost theoretical yields and in a crystalline form. When necessary they may be purified by the usual methods, as for example by crystallization or by treatment with hypochlorite solutions. They dye vegetable fibres various shades. Their leuco derivatives, as for example the leuco esters, may be obtained by the usual methods.

The following examples will further illustrate the nature of this invention but the invention is not restricted to these examples. The parts are by weight.

Example 1

9 parts of quinoline-6-carboxylic acid are converted into quinoline-6-carboxylic acid chloride by heating with an excess of thionyl chloride. After the excess of thionyl chloride has been distilled off in vacuo, the acid chloride is suspended in from 200 to 300 parts of nitrobenzene and 16 parts of 1-amino-5-benzoylaminoanthraquinone are added thereto. The whole is heated to boiling for some time while stirring. As soon as the evolution of hydrogen chloride has ceased, the whole is filtered while hot. After cooling, the reaction product which crystallizes out in an excellent yield is filtered off by suction and washed with alcohol. It is an orange yellow crystal powder which dissolves in sulphuric acid giving a yellow red coloration and which dyes cotton very powerful clear reddish yellow shades of very good fastness from a violet vat.

The reaction product obtainable in an analogous manner from 1-aminoanthraquinone gives green yellow dyeings, that from 1-amino-4-benzoylaminoanthraquinone scarlet red, that from 4-aminoanthraquinone-2.1-benzacridone violet and that from diaminoanthanthrone (obtainable from anthanthrone by nitration with nitric acid in an organic medium and subsequent reduction) red dyeings.

Instead of quinoline-6-carboxylic acid, other quinoline-Bz-carboxylic acids, as for example quinoline-5- or -7-carboxylic acids, may be condensed with vattable amino compounds of polynuclear diketones or polyketones, reaction products having similar properties being obtained.

By condensing 1-chlor-5-benzoylaminoanthraquinone with quinoline-6-carboxylic acid amide, a reaction product is obtained the properties of which agree with those of the above first-mentioned product.

*Example 2*

The finely powdered quinoline-6-carboxylic acid chloride obtained from 18 parts of quinoline-6-carboxylic acid according to Example 1 is suspended in from 200 to 300 parts of nitrobenzene, 12 parts of 1.5-diaminoanthraquinone are introduced and the mixture heated to boiling, while stirring, under a reflux condenser until the evolution of hydrogen chloride has ceased. The reaction mixture is filtered by suction while still hot and the remaining yellow reaction product is washed well with hot nitrobenzene and then with alcohol. It dissolves in sulphuric acid giving an orange coloration and dyes cotton very powerful reddish yellow shades having very good fastness properties from a violet vat. When necessary, the dyestuff may be purified by crystallization from quinoline or similar solvents of high boiling point or by treatment with sodium hypochlorite solution.

The same compound is obtained, when a mixture of 25 parts of 1.5-dichloranthraquinone, 300 parts of naphthalene, 25 parts of potassium carbonate and 2 parts of copper is boiled for from 10 to 15 hours and worked up.

*Example 3*

65 parts of quinoline-5.8-dicarboxylic acid are warmed with an excess of thionylchloride whereby the corresponding acid chloride is formed, while hydrochloric acid is evolved. When the reaction is finished which may be seen from the fact that hydrogen chloride is no longer formed, the excess of thionylchloride is distilled off. The acid chloride obtained is heated together with 200 parts of 1-amino-5-benzoylaminoanthraquinone in 5000 parts of dichlorbenzene to boiling for several hours. Then the liquid is filtered while still at the boiling temperature. From the filtrate the dyestuff formed crystallizes in yellow needles. The dyestuff gives a wine-red vat from which it dyes the vegetable fibre strong, very clear yellow shades of good fastness properties.

*Example 4*

10 parts of 1-amino-5-methoxyanthraquinone, 10 parts of the hydrochloride of quinoline-6-carboxylic acid chloride and 250 parts of dichlorobenzene are heated to boiling in a vessel provided with a reflux condenser. As soon as the evolution of hydrogen chloride has ceased the solution is filtered while still hot. The reaction product forms yellow crystals which dissolve in sulphuric acid giving a yellowish brown color. The reaction product gives an orange red vat from which it dyes cotton greenish yellow shades of good fastness.

If instead of quinoline-6-carboxylic acid chloride isoquinoline-1-carboxylic acid chloride is employed a dyestuff yielding yellow shades is obtained.

In the following table a number of components is listed from which dyestuffs may be obtained in a similar manner as described in the above examples. In column 1 the vattable amino components are mentioned, in column 2 the other components, namely the polynuclear carboxylic acids of the kind in question. In column 3 the color of the dyeings obtained from the resulting dyestuffs is set forth.

| Basic component | Acid component | Color |
|---|---|---|
| 1.5-diaminoanthraquinone | Bromo-quinoline-6-carboxylic acid. | Reddish yellow. |
| 1-amino-5-benzoylamino-anthraquinone. | Bromo-quinoline-6-carboxylic acid. | Golden yellow. |
| 1-amino-5-benzoylamino-anthraquinone. | Quinoline-5-carboxylic acid. | Greenish yellow. |
| 1-amino-5-benzoylamino-anthraquinone. | Quinoline-8-carboxylic acid. | Greenish yellow. |
| 1-aminoanthraquinone | Quinoline-5.8-dicarboxylic acid. | Green yellow. |
| 1-aminoanthraquinone | Quinoline-5.7-dicarboxylic acid. | Green yellow. |
| 2-aminoanthraquinone | Quinoline-6-carboxylic acid. | Green yellow. |
| 1-amino-5-p-chlorbenzoyl-aminoanthraquinone. | Quinoline-6-carboxylic acid. | Yellow. |
| 1-amino-5-dichlorobenzoyl-aminoanthraquinone. | Quinoline-6-carboxylic acid. | Yellow. |
| 2-amino-3-cyanoanthraquinone | Quinoline-6-carboxylic acid. | Green yellow. |
| 1.4-di(m-methoxybenzoyl) amino-5-aminoanthraquinone. | Quinoline-6-carboxylic acid. | Blue red. |
| 5-amino-5'-benzoylamino-1.1'-anthrimide carbazole. | Quinoline-6-carboxylic acid. | Golden orange. |
| 4-amino-5-benzoylamino 8-methoxyanthrimide carbazole. | Quinoline-6-carboxylic acid. | Red brown. |
| 5.5'-diamino-1.1'-oxamidoanthraquinone. | Quinoline-6-carboxylic acid. | Golden orange. |
| Monoaminoanthanthrone | Quinoline-6-carboxylic acid. | Blue red. |
| Monoamino-allo-ms-naphtho-dianthrone. | Quinoline-6-carboxylic acid. | Red. |
| 4-amino-1.2-o-chlorphenylanthraquinoneimideazole. | Quinoline-6-carboxylic acid. | Orange. |
| 5-aminoanthrasulphone | Quinoline-6-carboxylic acid. | Yellow. |
| 1.5-diamino-4.8-dihydroxyanthraquinone. | Quinoline-6-carboxylic acid. | Violet. |

*Example 5*

A mixture of 12 parts of 8-azabenzanthrone-Bz1-carboxylic acid chloride, 250 parts of nitrobenzene and 13 parts of 1-amino-5-benzoylaminoanthraquinone is boiled until hydrogen chloride no longer escapes. After cooling the reaction product is filtered off by suction, washed and dried. It dyes from a Bordeaux-red vat vegetable fibres golden yellow shades which are very fast to light, chlorine and keir-boiling.

If instead of 1-amino-5-benzoylaminoanthraquinone 1.5-diaminoanthraquinone is employed a dyestuff is obtained which dyes vegetable fibres similar shades. If 1-aminoanthraquinone, 5-amino-1.9-anthrapyrimidine or 4-amino-1.9-anthrapyrimidine are employed dyestuffs are obtained which dye vegetable fibres clear greenish yellow shades from red-violet vats.

If Bz3-azabenzanthrone-Bz1-carboxylic acid chloride (obtainable by causing Bz1-brom-Bz3-azabenzanthrone to react with cuprous cyanide, saponifying the carboxylic acid nitrile formed and treating the carboxylic acid with phosphorus pentachloride) or Bz3-azabenzanthrone-Bz2-carboxylic acid chloride (obtainable by condensing anthraquinone-1-aldehyde with benzoylamino acetic acid, splitting off water from the condensation product, saponification and treating the carboxylic acid formed with phosphorus pentachloride) are heated with 1.3-diaminoanthraquinone in the presence of nitrobenzene at between 130° and 150° C., vattable acylamines are obtained which dye vegetable fibres yellow shades from brown-red vats.

If 6.7-benzo-3.10-diazapyrene-4.4'-dimethyl-2-carboxylic acid chloride (obtainable by condensing 1.4-diaminoanthraquinone-2-carboxylic acid with acetone in the presence of alkali and treating the carboxylic acid formed with thionylchloride) is condensed with 1-amino-5-benzoylamino-8-methoxyanthraquinone a vat dyestuff is obtained which dyes vegetable fibres reddish yellow shades from a brown-violet vat.

By condensing 8-azabenzanthrone-6,Bz1-dicarboxylic acid with 2 molecular proportions of 1-amino-4-hydroxyanthraquinone a vat dyestuff is obtained which dyes vegetable fibres clear rose shades from a violet vat.

*Example 6*

A mixture of 23.5 parts of quinoline-5.8-dicarboxylic acid chloride, 200 parts of pure nitrobenzene, 23 parts of 1-amino-anthraquinone and 25 parts of 1-amino-5-methoxyanthraquinone is heated, while stirring, at between 150° and 170° C. until the amino compounds employed have entirely disappeared. After cooling the reaction mixture is worked up in the usual manner. The dyestuff thus obtained is a yellow powder which dyes vegetable fibres from a violet vat powerful greenish yellow shades of very good fastness.

*Example 7*

45 parts of 4-azaphenanthrene-10-carboxylic acid are converted into the corresponding carboxylic acid chloride by means of thionyl chloride. The carboxylic acid chloride is then mixed with 60 parts of 1-amino-5-benzoylaminoanthraquinone and 2000 parts of nitrobenzene (or trichlorbenzene). The mixture is then boiled until hydrogen chloride no longer escapes. After cooling the dyestuff is filtered off by suction and washed with benzene. It dyes vegetable fibres from a violet-red vat very clear shades of good fastness properties. Instead of the said carboxylic acid other carboxylic acids of azaphenanthrenes as for example 4-azaphenanthrene-8-carboxylic acid or 1-azaphenanthrene-7-carboxylic acid may be employed. Instead of 1-amino-5-benzoylaminoanthraquinone the corresponding amount of 1.5-diaminoanthraquinone can be used.

By condensing 26 parts of 1-azanthraquinone-5-carboxylic acid chloride with 15 parts of 1.5-diamino-4.8-dihydroxyanthraquinone in the presence of dichlorbenzene at from 130° to 140° C. a vat dyestuff is obtained which dyes vegetable fibres violet shades. By condensing 28 parts of 2-azanthraquinone carboxylic acid chloride with 25 parts of mono-amino-1-azanthraquinone a vat dyestuff is obtained which dyes vegetable fibres orange shades. Vat dyestuffs yielding similar shades on vegetable fibres are obtained if the said carboxylic acid is condensed with 4-amino-(N)methylanthrapyridone or 4-amino-(N)methylanthrapyrimidone.

By condensing 4-azaphenanthrene-10-carboxylic acid chloride with 4-amino-2(N)-1-anthraquinoneoxazole a vat dyestuff is obtained which dyes vegetable fibres yellow shades from a violet vat.

By condensing 35 parts of 4-amino-Bz2.3.5-trichloranthraquinone-2.1-benzacridone with 4-azaphenanthrene-10-carboxylic acid chloride in the presence of nitrobenzene at 180° C. a vat dyestuff is obtained which dyes vegetable fibres blue-violet shades from a violet vat.

*Example 8*

10.5 parts of quinoline-4-carboxylic acid are converted into the corresponding carboxylic acid chloride by means of thionylchloride. After distilling off the excess of the thionylchloride the carboxylic acid chloride is mixed with 200 parts of nitrobenzene and 10.5 parts of 1-amino-5-benzoylamino-anthraquinone. The reaction mixture is heated, while stirring, at about 175° C. until the amino compound has disappeared. After cooling and working up a dyestuff is obtained which dissolves in concentrated sulfuric acid giving a red-brown coloration. It dyes animal and vegetable fibres very fast yellow shades from a red-violet vat.

The dyestuff which can be obtained in a corresponding manner from 2 molecular proportions of quinoline-4-carboxylic acid chloride and 1 molecular proportion of 1.5-diaminoanthraquinone dyes vegetable fibres likewise yellow shades from a brown-violet vat.

The acylamines obtainable by condensing quinoline-2- or -3-carboxylic acid chloride with 1-amino-5-benzoylaminoanthraquinone dye vegetable fibres golden yellow shades from a dark violet vat.

By condensing 1 molecular proportion of quinoline-4.6-dicarboxylic acid chloride with 2 molecular proportions of 1-aminoanthraquinone in the presence of nitrobenzene at 170° C. a dyestuff is obtained which yields powerful clear yellow shades of very good fastness. Similar dyestuffs yielding yellow shades are obtained by condensing 1(N)-2-pyridinoanthraquinone-2-, -4-, -5- or -8-carboxylic acid chloride with 1-amino-5-benzoylaminoanthraquinone. By condensing the pyridinoanthraquinone-carboxylic acid which can be obtained by causing (aminopyridino)-anthraquinone to react with cuprous cyanide and saponifying the acid nitrile formed with 5-amino-1.9-anthrapyrimidine in the presence of pyridine an acylamine is obtained which yields from a dark violet vat clear tints of very good fastness.

If 2(N)-1-pyridinoanthraquinone-3-carboxylic acid chloride is condensed with 1-aminoanthraquinone in the presence of trichlorbenzene a vat dyestuff is obtained which dyes vegetable fibres yellow shades.

*Example 9*

A mixture of 25 parts of 1-amino-5-quinoline-6'-carbonylaminoanthraquinone, 30 parts of quinoline-4-carboxylic acid chloride and 200 parts of orthodichlorbenzol is boiled until unchanged initial material is no longer detectable. After cooling and working up a dyestuff is obtained which is 1 - quinoline - 4' - carbonylamino-5-quinoline-6'-carbonylaminoanthraquinone. It dissolves in concentrated sulfuric acid giving a brown-red coloration and dyes vegetable fibres yellow shades from a violet blue vat.

If instead of quinoline-4-carboxylic acid chloride 35 parts of 8-azabenzanthrone-Bz1-carboxylic acid chloride are employed a vat dyestuff yielding yellow shades is obtained.

What we claim is:

1. Pyridino - acylaminoanthraquinones which contain at least once the radical of an aromatic compound containing up to three condensed isocyclic rings condensed with at least one pyridine ring, the said radical being attached to at least one radical of a vattable compound of the anthraquinone series by means of a —CO.NH— bridge, the —CO— being attached to the component containing the pyridine ring.

2. Pyridino - acylaminoanthraquinones corresponding to the general formula

R—NH—CO—R' wherein R stands for the radical of a vattable compound of the anthraquinone series and R' for the radical of an aromatic compound containing up to three condensed isocyclic rings condensed with at least one pyridine ring.

3. Pyridino - acylaminoanthraquinones corresponding to the general formula

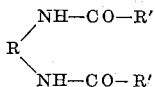

wherein R stands for the radical of a vattable compound of the anthraquinone series and each R' for the radical of an aromatic compound containing up to three condensed isocyclic rings condensed with at least one pyridine ring.

4. Pyridino - acylaminoanthraquinones corresponding to the general formula

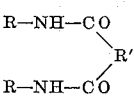

wherein each R stands for the radical of a vattable compound of the anthraquinone series and R' for the radical of an aromatic compound containing up to three condensed isocyclic rings condensed with at least one pyridine ring.

5. Pyridino - acylaminoanthraquinones which contain at least once the radical of an aromatic compound containing up to three condensed isocyclic rings condensed with at least one pyridine ring, the said radical being attached to at least one radical of an anthraquinone by means of a —CO.NH— bridge, the —CO— being attached to the component containing the pyridine ring.

6. Pyridino - acylaminoanthraquinones which contain at least once the radical of a pyridino compound containing up to three isocyclic condensed rings condensed with the pyridine ring, the said radical being attached to at least one radical of a vattable compound of the anthraquinone series by means of a —CO.NH— bridge, the —CO— being attached to the component containing the pyridine ring.

7. Pyridino - acylaminoanthraquinones which contain at least once the radical of a pyridino compound containing up to three isocyclic condensed rings condensed with the pyridine ring, the isocyclic part of the said radical being attached to at least one radical of a vattable compound of the anthraquinone series by means of a —CO.NH— bridge, the —CO— being attached to the component containing the pyridine ring.

8. Pyridino - acylaminoanthraquinones which contain at least once the radical of a pyridino compound containing up to two isocyclic condensed rings condensed with the pyridine ring the said radical being attached to at least one radical of a vattable compound of the anthraquinone series by means of a —CO.NH— bridge, the —CO— being attached to the component containing the pyridine ring.

9. Pyridino - acylaminoanthraquinones which contain at least once the radical of a pyridino compound containing an isocyclic ring condensed with the pyridine ring the said radical being attached to at least one radical of a vattable compound of the anthraquinone series by means of a —CO.NH— bridge, the —CO— being attached to the component containing the pyridine ring.

10. Pyridino - acylaminoanthraquinones which contain at least once the radical of a quinoline the said radical being attached to at least one radical of a vattable compound of the anthraquinone series by means of a —CO.NH— bridge, the —CO— being attached to the component containing the pyridine ring.

11. Pyridino - acylaminoanthraquinones which contain at least once the radical of a quinoline the said radical being attached to at least one radical of an anthraquinone by means of a —CO.NH— bridge, the —CO— being attached to the component containing the pyridine ring.

12. Pyridino - acylamino-anthraquinones corresponding to the general formula:

R—NH—CO—R' wherein R stands for the radicle of an anthraquinone and R' for the radicle of a quinoline.

13. Pyridino-acylamino-anthraquinones corresponding to the general formula:

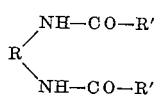

wherein R stands for the radicle of an anthraquinone and each R' for a radicle of a quinoline.

14. Pyridino-acylamino-anthraquinones corresponding to the general formula:

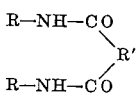

wherein each R stands for a radicle of an anthraquinone and R' for the radicle of a quinoline.

15. The vat dyestuff corresponding to the formula:

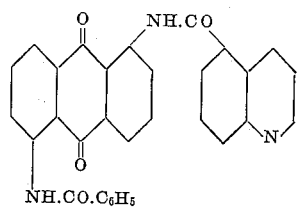

which has an orange yellow color, dissolves in sulfuric acid giving a yellow red coloration and which dyes vegetable fibres very powerful clear reddish yellow shades of very good fastness from a violet vat.

16. The vat dyestuff corresponding to the formula:

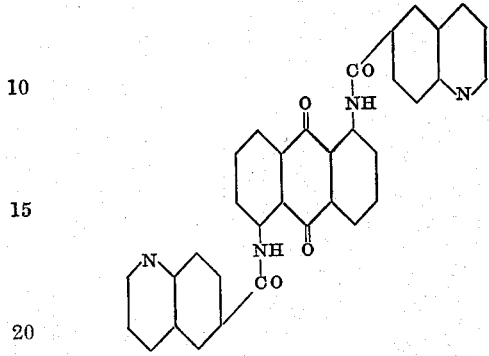

which dissolves in sulfuric acid giving an orange coloration and dyes vegetable fibres very powerful reddish yellow shades having very good fastness properties from a violet vat.

17. The vat dyestuff corresponding to the formula:

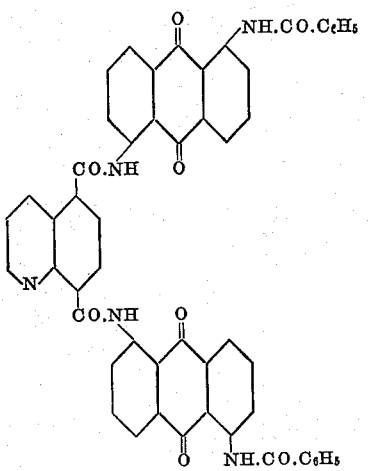

which has a yellow color, gives a wine red vat from which vegetable fibres are dyed strong, very clear yellow shades of good fastness.

MAX ALBERT KUNZ.
KARL KOEBERLE.
GERD KOCHENDOERFER.